2,923,616

MANUFACTURE OF TITANIUM

Arthur James Smith, Widnes, England, assignor to Imperial Chemical Industries Limited, London, England, a corporation of Great Britain No Drawing. Application January 17, 1957
Serial No. 634,621

Claims priority, application Great Britain
January 27, 1956

4 Claims. (Cl. 75—84.5)

This invention relates to the manufacture of refractory metals and more particularly to an improved method for the manufacture of titanium, zirconium and hafnium.

In the manufacture of refractory metals such as titanium, zirconium and hafnium by the reduction of the refractory metal chloride with metallic sodium in an inert atmosphere, there remains after reaction is completed a mixture of the refractory metal and sodium chloride together with an excess of either of the reactants which may have been present. In the case of titanium, several methods have been devised to isolate the titanium from the remainder of the mixture as for example distillation of the products and also leaching the salt and excess of reactants by means of solvents. One method which has been commonly used is to leach the mixture with an aqueous solution, preferably an aqueous solution of hydrochloric acid, and by this method it is possible to dissolve out the salt and excess reactants from the mixture. It has been found, however, that by this method the titanium finally isolated has suffered from the deleterious effects of hydrogen pick-up and that the titanium product obtained after finally arc melting is not generally of a quality desirable from the metallurgical point of view. We have now found that the deleterious effects of hydrogen pick-up in the aqueous leaching stage can be largely if not completely overcome by a new and modified procedure for extracting and isolating the titanium, and that this is applicable in a no less extent in the manufacture and isolation of zirconium and hafnium.

According to the present invention a process for the manufacture of a refractory metal from the group titanium, zirconium and hafnium, comprises reacting a chloride of said metal with metallic sodium, adding the cooled products of reaction to an aqueous solution of hydrochloric acid, degassing the slurry so formed, treating the degassed material to obtain a thickened slurry and isolating the refractory metal therefrom.

In one suitable method of carrying out the process of the invention, the main reaction between the refractory metal chloride and metallic sodium is carried out in an inert atmosphere at a temperature above the melting point of sodium chloride and below that of the refractory metal. In the manufacture of titanium we prefer to react metallic sodium with an excess of titanium tetrachloride. After the reaction is complete and the products are cooled the mixture is ground to a fine powder and is then added to a stirred aqueous solution of hydrochloric acid. At this stage we have found that there is present in the brine-refractory metal slurry hydrogen in the form of small bubbles which are dispersed throughout the solution and tend to adhere to the particles of the refractory metal. It is a primary feature of our invention therefore that at this stage the slurry of refractory metal and solution is degassed before any further steps are taken to isolate the metal.

We have found that a degassing operation lasting for about 30 seconds is sufficient to give satisfactory removal of unwanted gases but it is desirable that degassing should proceed for not less than 3 seconds. At the end of this time and in order to obtain a thickened slurry the material may be transferred to a hydrocyclone.

Following the first hydrocyclone the slurry may then be washed with acidified water and re-thickened in successive hydrocyclones until a final slurry is obtained which contains only a small amount of sodium chloride. To finally isolate the refractory metal the final slurry may be washed with water and filtered to give a metal which, on arc melting gives a product of good quality.

The following example illustrates but does not limit our invention.

Example

A titanium-salt melt containing 16% titanium metal was ground to pass a ⅛″ B.S.S. mesh and then fed into a stirred vessel at the rate of 1000 lb. per hour, together with 2 m.³/hour water and 0.06 m.³/hour concentrated hydrochloric acid. The slurry so obtained was pumped into a vessel where degassing took place. The degassed slurry was then passed on to a hydrocyclone. From the hydrocyclone a thickened slurry containing approximately 40% by weight of titanium and 60% by weight of brine was passed to a slurrying vessel with a 2 m.³/hour water and 0.03 m.³/hour concentrated hydrochloric acid. This thin slurry was then pumped to a cone washer where the titanium metal was washed by an upward stream of water until it was free from chlorine ion, after which it was filtered on a nutsch filter. The wet metal was then dried in a fluidised bed drier to give titanium powder with a hydrogen content of 0.003%, which on arc melting was found to yield a massive titanium with hardness of approximately 150 DPN. The efficiency of recovery was over 98%.

What I claim is:

1. A process for the manufacture of a refractory metal selected from the group consisting of titanium, zirconium and hafnium, which comprises reacting a chloride of the said metal with metallic sodium, adding the cooled products of reaction to an aqueous solution of hydrochloric acid, degassing the slurry so formed prior to any washing step for not less than three seconds to effect substantial removal of any hydrogen present in said slurry, treating the degassed material to obtain a thickened slurry and isolating the refractory metal therefrom.

2. A process according to claim 1 in which the material after degassing is passed through at least one hydrocyclone to obtain a said thickened slurry.

3. A process according to claim 1, in which titanium tetrachloride in excess is reacted with metallic sodium and titanium is isolated therefrom.

4. A process according to claim 1, in which the degassing operation is carried out in a separate vessel from that in which the reaction products are added to the aqueous solution of hydrochloric acid.

References Cited in the file of this patent

UNITED STATES PATENTS

| 1,646,734 | Marden | Oct. 25, 1927 |
| 2,537,068 | Lilliendahl et al. | Jan. 9, 1951 |